April 22, 1969  YOSHIO ANDO ET AL  3,439,858
BRAZING COMPOSITION FOR CARBONACEOUS MATERIALS
Original Filed June 22, 1964
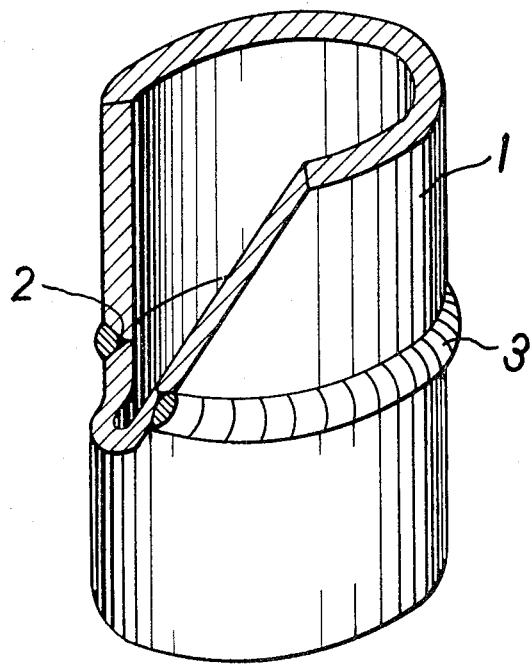
INVENTORS
Yoshio Ando
Tadato Fujimura
Tadayoshi Tanaka
Yoshihiko Inoue
Stevens, Davis, Miller & Mosher ATTORNEYS

United States Patent Office 3,439,858
Patented Apr. 22, 1969

---

3,439,858
BRAZING COMPOSITION FOR CARBONACEOUS MATERIALS
Yoshio Ando, Tokyo, Tadato Fujimura, Naka-gun, Ibaraki, and Tadayoshi Tanaka and Yoshihiko Inoue, Tokyo, Japan, assignors to Japan Atomic Energy Research Institute, Tokyo, Japan, a corporation of Japan
Original application June 22, 1964, Ser. No. 376,880. Divided and this application Nov. 4, 1966, Ser. No. 608,469
Claims priority, application Japan, Sept. 26, 1963, 38/51,286, 38/51,287
Int. Cl. B23k 3/06, 35/14, 31/02
U.S. Cl. 228—56      1 Claim

---

ABSTRACT OF THE DISCLOSURE

A material primarily for brazing carbonaceous materials comprising an iron-nickel alloy containing a small proportion of zirconium or titanium and having good workability and adhesiveness to said materials particularly at high temperatures.

---

This application is a division of our copending application, Ser. No. 376,880, filed June 22, 1964.

The present invention relates to a method of brazing carbonaceous materials with each other and carbonaceous material with metal articles characterized by forming a V-shaped recess between articles to be joined and welding metallic titanium at bottom of the recess as the first layer, then welding iron-nickel alloy on said first layer of titanium as the second layer by heating for brazing the joining parts. The invention also relates to improved brazing material for jointing carbonaceous materials with each other and with metal articles which consists of a uniform mixture of powdered metal elements of Fe, Ni, Ti or Zr, Si and Bo in the form of paste by using an organic binder.

The carbonaceous materials have been recently developed to a great extent and its application to various industries has been rapidly expanding. Its excellent characteristics in anti-corrosion equipments for chemical industries, in fuel canning material for atomic reactors, in heat-resisting nozzles for rockets and in other new fields of the industry have been clearly revealed, however, the difficulty in jointing carbonaceous materials with each other and with metal articles has been a bottleneck in forming structures of carbonaceous materials. From the standpoint of brazing materials, no satisfactory anti-corrosion characteristics against strong acids and alkalis have been developed yet, and further improvement in workability and adhesiveness has been desired.

The first object of the invention is to provide an improved anti-corrosive brazing method using double layers of brazing materials of titanium and iron-nickel alloy. The second object of the invention is to provide novel brazing materials having higher workability and higher adhesiveness.

In carrying the invention into effect the method is characterized in forming at first a V-shaped recess or groove between two carbonaceous articles to be joined, putting a certain quantity of metallic titanium in the form of a wire, for example, at bottom of said recess where it is liable to cause corrosion, fusing and welding said titanium wire by heating from a suitable heat source to form the first layer of brazing for prevention from leakage of corrosive fluid, and then welding iron-nickel brazing alloy material thereon to form the second brazing layer. The invention is also characterized in that the workability and adhesiveness of brazing material can be improved by changing the configuration of the carbonaceous brazing material into powdered form and by converting the powdered brazing material into paste with the addition of organic high molecular weight substance, namely the brazing material of the invention consists of a uniform mixture of metal elements such as iron, nickel, titanium, zirconium, silicon and boron in a suitable ratio according to the objects for use and grinding the mixture in a ball mill etc. to provide fine powder, and further adding to the powdered brazing material an adhesive high molecular weight compound having easily adjustable viscosity such as styrol, methylmethacrylate, methylacrylate, ethylacrylate, xylene formaldehyde, etc. as the binder for improving workability by making the mixture into paste.

For using the brazing material of the invention for jointing carbonaceous materials, the brazing material of the invention is applied to the recess or groove provided between articles of the carbonaceous material to be joined, and heated in an oven in vacuo or other inert gas atmosphere such as argon, helium, hydrogen or nitrogen by using electric resistance heating or high frequency induction heating or other suitable heating system. In the process of heating, the organic high molecular weight binder is gasified and evaporated to remain only the brazing material consisting of pure metal elements and this brazing material is melted at the brazing temperature and makes wet contact the jointing part of two carbonaceous articles and thus the jointing function is completed to firmly unite together two articles.

For a better understanding of the invention reference is taken to the accompanying drawing, in which a single figure is a partial sectional view illustrating a manner of jointing two cylindrical tubes of carbonaceous material together, the first layer of which is brazed with titanium and the second layer of which is brazed with iron-nickel alloy.

When the joint part of carbonaceous materials 1 as shown in the drawing is to be coupled, a wire, plate or powder of metallic titanium is placed on the joint part. This metallic titanium is welded to the gap in the bottom of said recess through heating in vacuo or in inert gas atmosphere by applying suitable heating system, such as electric arc heating, high frequency induction heating or heating by directly passing electric current and thus formed the second brazing layer 3 on the first brazing layer of titanium 2 by filling said recess between two carbonaceous articles.

The titanium welded to the bottom of recess prevents the leakage of the corrosive fluid from inside of the carbonaceous material joint to the outside, and further iron-nickel alloy material welded and stuffed on the titanium layer firmly adheres two parts together. The thermal expansion coefficient of the iron-nickel alloy brazing material coincides with that of the carbonaceous material, and no crack will occur on the welded brazing material and the strength of the joint is maintained at higher temperatures. In the welded titanium layer, the thermal expansion coefficient of carbonaceous material is different from that of titanium and if thick padding is provided for maintaining mechanical strength the welded stuff is subject to rather frequent cracking, and hence the filling should be made comparatively thin layer sufficient for the prevention of the leakage of the corrosive fluid only.

The composition of the brazing material of iron-nickel alloy to be used for the second layer is as follows:

| | Weight percent |
|---|---|
| Iron | 30–70 |
| Nickel | 20–50 |
| Titanium or zirconium | 5–20 |
| Silicon | 0–10 |
| Boron | 0–5 |

An embodiment of the invention will be further explained in detail by examples.

EXAMPLE 1

A titanium wire of 0.5 mm. in diameter was inserted at bottom of the recess formed between the carbonaceous tubes, and was welded thereto as the first layer in an inert gas atmosphere by using an electric torch and starting arc at direct current of 100–150 amperes. The second layer thereon was stuffed by using the same torch and with direct current of 120–200 amperes. The brazing material to be used for the second layer was a wire of said iron-nickel alloy of 2 mm. diameter. This method facilitates easy formation of a large and complicated shaped container of carbonaceous material which has acid proof and alkali resisting properties and which was very difficult to manufacture before.

EXAMPLE 2

A mixture of said metal powders in the same composition and ratio as shown in the Example 1 is made into paste with addition of styrol as the binder. In accordance with the shape and material of the objects to be joined, 10 parts by weight of the powdered mixture are mixed with 1–10 parts by weight of styrol. For the styrol to be used as binder, 80% by weight of polystyrol in the market and 20% by weight of monomer were mixed to have viscosity of 80 poises at room temperature.

The reason for using styrol and the like organic substance as the binder is due to the fact that the residual carbon is scarce after the thermal cracking, and oxygen is not contained in the composition and hence chance of oxidizing the brazing material is seldom too.

The brazing temperature of the brazing material of the invention is 1,400–1,600° C. The brazing material of the invention enabled easy formation of carbonaceous material structure and the combined structures of carbonaceous material and metallic material. Any suitable mixture ratio of pure metal powder can be used for providing the brazing material to suit the type of the object, and thus the brazing material can be made very easily and very economically. The brazing material in the form of adhesive paste by using organic high molecular weight binder enables easy application of the brazing material on the parts to be joined, and thus, complicated joints and joints of high accuracy can be made very easily.

What we claim is:

1. A brazing material for jointing carbonaceous materials with each other and with metal articles which consists essentially of a uniform mixture of the following elements in the following proportions: 30–70% by weight of iron, 20–50% by weight of nickel, 5–20% by weight of element selected from the group consisting of titanium and zirconium, 0–10% by weight of silicon, and 0–5% by weight of boron, and being in the form of paste by using as binder organic high molecular weight substance having easily adjustable viscosity selected from the group consisting of styrol, methylmethacrylate, methylacrylate, ethylacrylate, and xylene-formaldehyde.

References Cited

UNITED STATES PATENTS

| | | | |
|---|---|---|---|
| 2,739,375 | 3/1956 | Coxe | 228—56 X |
| 2,908,072 | 10/1959 | Johnson | 228—56 X |

JOHN F. CAMPBELL, *Primary Examiner.*

U.S Cl. X.R.

29—472.7, 504